(12) United States Patent
Hoerschken et al.

(10) Patent No.: US 10,330,216 B2
(45) Date of Patent: Jun. 25, 2019

(54) CAGE ASSEMBLY WITH THROTTLE RINGS

(71) Applicant: SAMSON AG, Frankfurt am Main (DE)

(72) Inventors: Klaus Hoerschken, Villmar (DE); Andreas Sander, Laudenbach (DE)

(73) Assignee: SAMSON AG, Frankfurt am Main (DE)

(*) Notice: Subject to any disclaimer, the term of this patent is extended or adjusted under 35 U.S.C. 154(b) by 0 days.

(21) Appl. No.: 15/498,353

(22) Filed: Apr. 26, 2017

(65) Prior Publication Data

US 2017/0314703 A1 Nov. 2, 2017

(30) Foreign Application Priority Data

Apr. 27, 2016 (DE) .................... 20 2016 102 245 U

(51) Int. Cl.
  *F16K 1/32* (2006.01)
  *F16K 47/08* (2006.01)
  *F16K 3/24* (2006.01)

(52) U.S. Cl.
  CPC ............... *F16K 47/08* (2013.01); *F16K 1/32* (2013.01); *F16K 3/246* (2013.01)

(58) Field of Classification Search
  None
  See application file for complete search history.

(56) References Cited

U.S. PATENT DOCUMENTS

| | | | | |
|---|---|---|---|---|
| 3,631,891 A | * | 1/1972 | Brumm | F16K 31/1266 137/625.3 |
| 3,693,659 A | * | 9/1972 | Parola | F16K 3/22 137/625.3 |
| 4,221,037 A | | 9/1980 | Seger | |
| 4,834,133 A | * | 5/1989 | LaCoste | F16K 3/246 137/315.11 |
| 9,151,407 B2 | * | 10/2015 | Fontaine | F16K 47/04 |
| 2007/0272316 A1 | | 11/2007 | Zecchi et al. | |

FOREIGN PATENT DOCUMENTS

| | | |
|---|---|---|
| DE | 2 224269 A | 6/1973 |
| DE | 2458321 | 6/1976 |
| DE | 2458321 A1 | 6/2014 |
| WO | 2004106792 A1 | 9/2004 |
| WO | 2014/070977 A1 | 5/2014 |
| WO | 2016043718 | 3/2016 |

OTHER PUBLICATIONS

German Patent and Trademark Office, Examination Report, dated Aug. 26, 2016, pp. 1-6, Application No. 20 2016 102 245.2 Applicant: Samson AG.

European Patent Office, Extended European Search Report, dated Aug. 24, 2017, pp. 1-7, Application No. 171682841, Applicant: Samson AG.

\* cited by examiner

*Primary Examiner* — John Fox
(74) *Attorney, Agent, or Firm* — Woodling, Krost and Rust

(57) ABSTRACT

The invention refers to a cage valve comprising a valve cover (20, 42, 62) and a valve cage, which latter comprises a retaining element (28, 54, 72) and a plurality of throttle elements (30) which are designed in the form of a hollow section. The invention is characterized in that the valve cage is connected to the valve cover (20, 42, 62).

3 Claims, 4 Drawing Sheets

CAGE ASSEMBLY WITH THROTTLE RINGS

Figure 1:
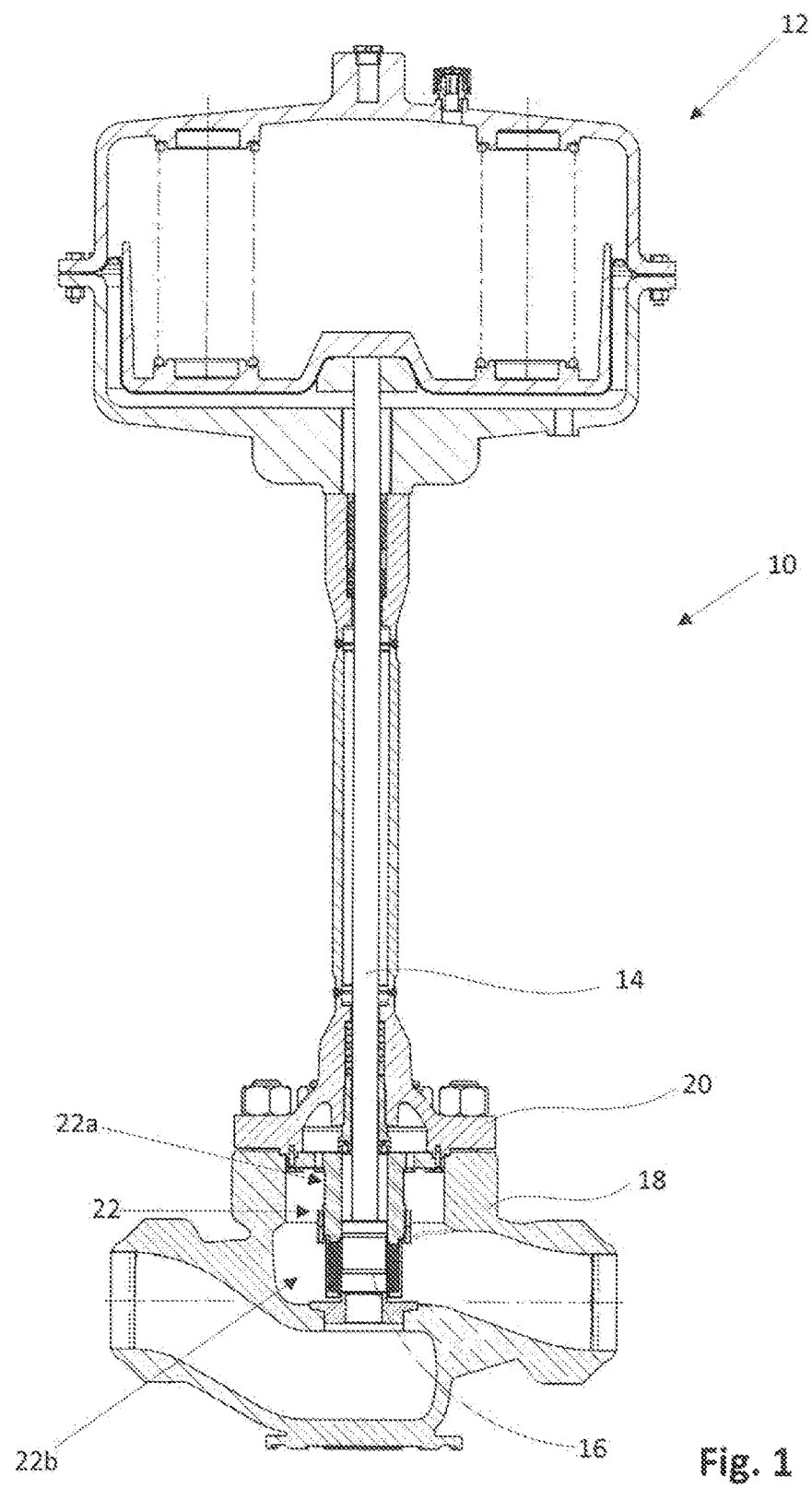

German patent application serial no. 20 2016 102 245.2, filed Apr. 27, 2016 is incorporated herein in its entirety by reference hereto. Priority is claimed to German patent application serial no. 20 2016 102 245.2, filed Apr. 27, 2016.

The present invention relates to a cage valve.

Document WO 2014/070977 discloses a control valve with a valve cage. The valve cage comprises stacked throttle disks. This design is intended to achieve noise abatement. In one embodiment, the throttle disks are attached to a first cage section by means of screws.

Document DE 24 58 321 discloses a control valve with a valve cage that is connected to a piston of the valve. The cage is filled with bulk material.

It is an object of the invention to provide a cage valve which can be assembled easily.

In a known manner, a cage valve comprises a valve cover and a valve cage. The valve cage in turn comprises a retaining element and a plurality of throttle elements which latter in particular take the form of hollow sections.

The invention provides for the valve cage to be firmly mounted on the valve cover.

The fact that the throttle elements can be made of a modular design thus allows for a high degree of flexibility regarding configuration, at the same time making for a fast and simple assembly of the valve, via its connection to the valve cover, since the valve cage is a prefabricated subassembly and can be attached as a cage assembly.

The valve cage preferably comprises a piston guide element. The piston guide element is adapted to guide the throttle element of the cage valve. Preferably, the retaining element of the valve cage can be fixed on the piston guide element.

In an advantageous manner, the retaining element can be adapted to be connected to the piston guide element by means of a screw thread, in particular in the form of a union nut. For this purpose, the piston guide element may be provided with an external thread, and the retaining element may be provided with a shoulder which can be connected to the piston guide element by means of a union nut.

Alternatively, the retaining element as well as the piston guide element can each include complementary flanges, with bores distributed along the periphery, by means of which the two parts can be connected.

The piston guide region can in turn comprise a flange with holes made into it which latter can be used to screw the piston guide element onto the valve cover.

Consequently, the valve cage can be mounted on the valve cover in a suspended manner, which makes for a simple assembly of the cage assembly. It is also possible to choose other fastening mechanisms for connecting the cage assembly to the valve cover.

The throttle elements in the form of hollow sections may in particular be designed as hollow cylinders. More specifically, hollow cylinders are tube sections, perforated disks and rings, and recesses are provided in the cylinder jacket which can be used to adjust the throttle effect.

The hollow sections are preferably fixed in the axial and radial directions by the retaining element.

According to an advantageous embodiment, the valve cage can be designed in such a way that the throttle elements are fixed in the axial direction both by means of the retaining element and by the piston guide region. This allows the throttle elements to be clamped in the axial direction between the retaining element at its end remote from the piston guide element and the piston guide region.

According to a further embodiment, the end of the retaining element which faces away from the valve cover may be designed as a valve seat. This allows the valve cage assembly to be introduced into the valve housing together with the valve cover in such a way that the valve seat is received in a mount provided for it in the valve housing.

Preferably, the valve seat may comprise an external thread and may be adapted to be screwed into the retaining element which fixes the throttle elements in the radial direction, thus also axially fixing the throttle elements.

Additional advantages, features and possible applications of the present invention will become apparent from the following description in conjunction with the embodiments illustrated in the drawings.

Figure 3:
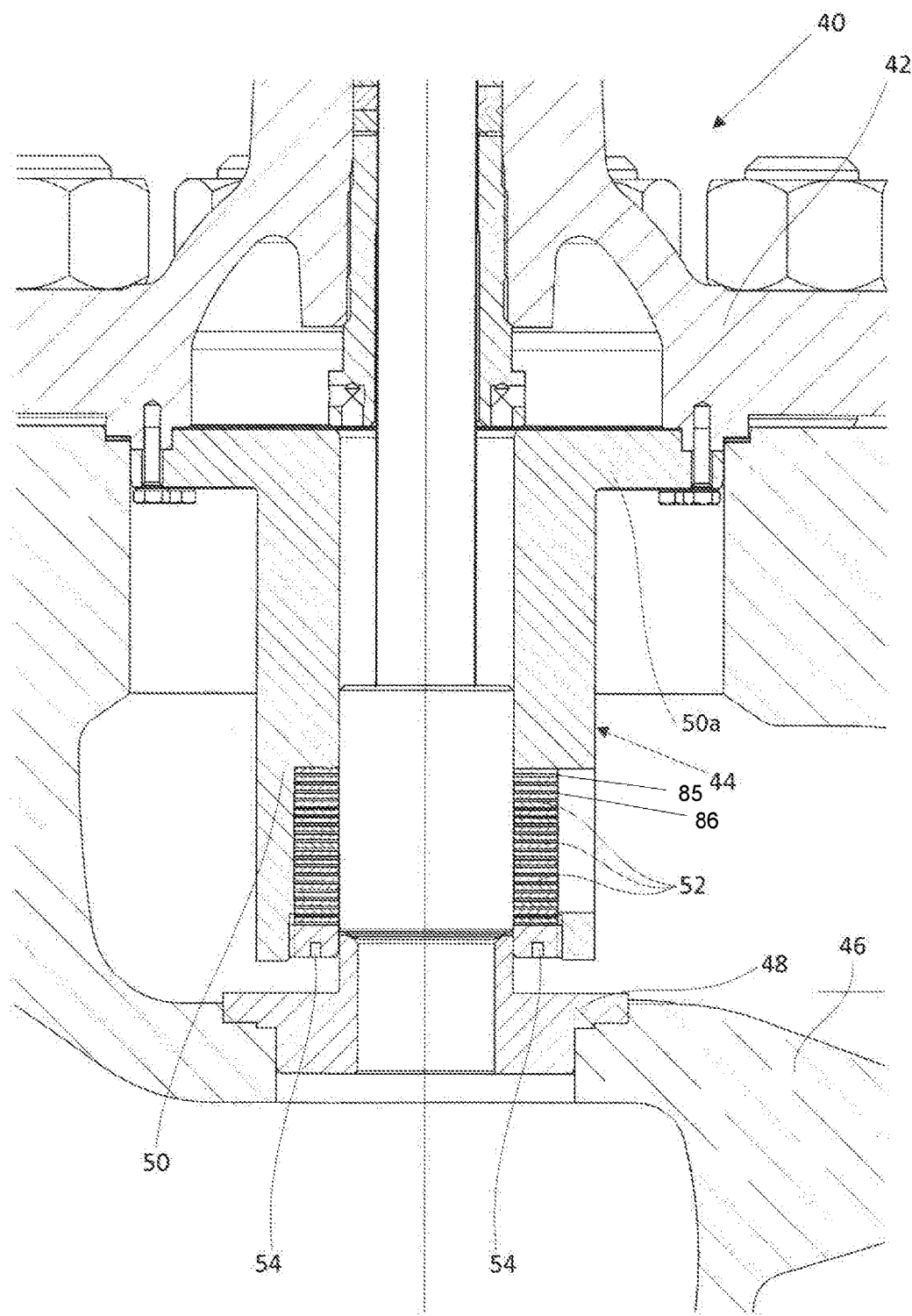
Figure 4:
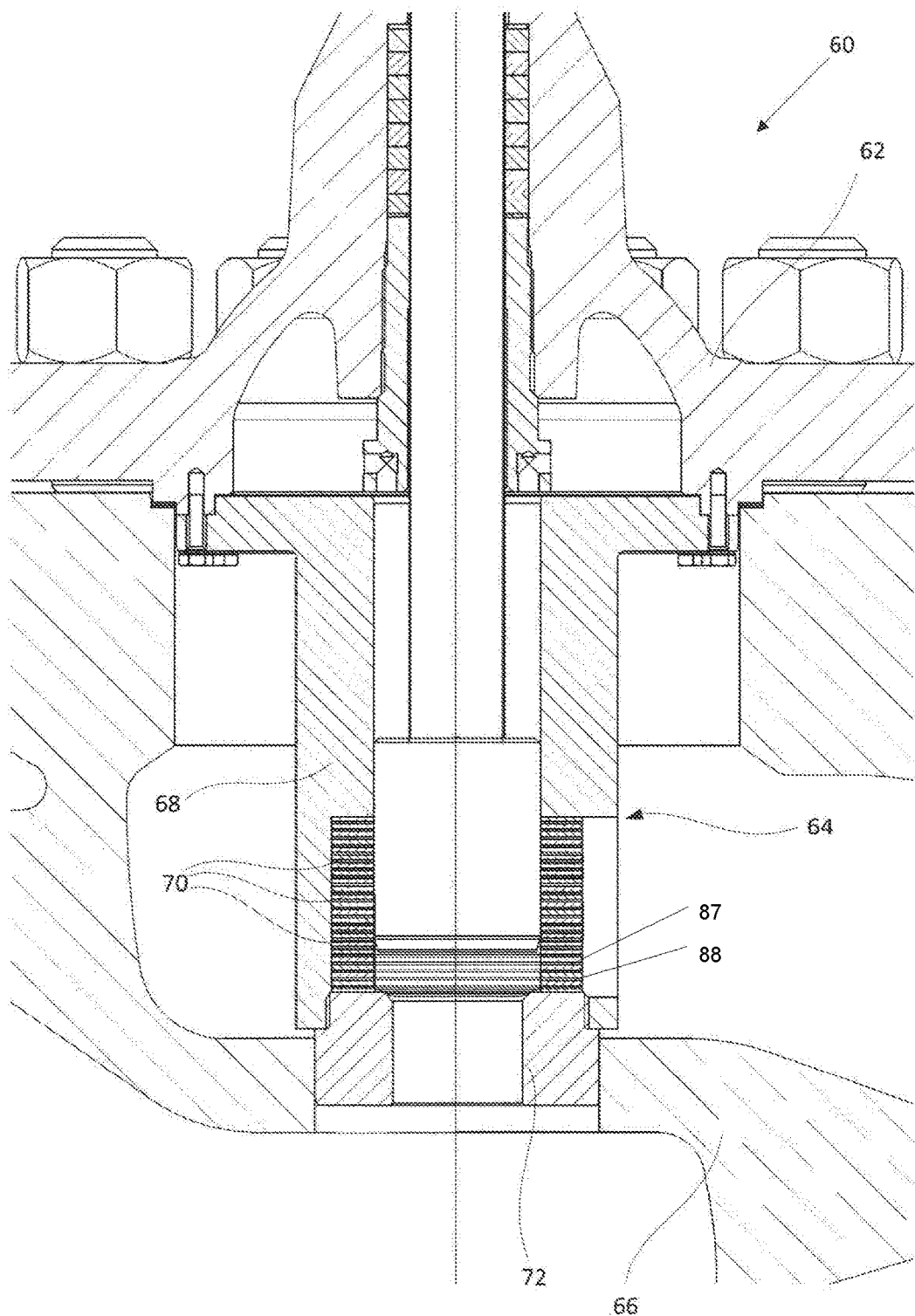

Throughout the description, the claims and the drawings, those terms and associated reference signs are used as are listed in the List of Reference Signs which follows below. In the drawings, FIG. 1 is a sectional view of a control valve, FIG. 2 is a view of an enlarged detail of the control valve of FIG. 1, FIG. 3 is a view of another embodiment of a control valve according to the invention, and FIG. 4 is a view of yet another embodiment of a control valve according to the invention with an integrated valve seat.

FIG. 1 is a sectional view of a control valve 10 according to the invention. A control valve of this type comprises a drive 12, a valve rod 14 as well as a piston 16. Furthermore, the control valve 10 comprises a basic valve body 18 which is closed by means of a valve cover 20. Attached to the valve cover 20 is a cage assembly 22 which will be described in more detail below with reference to FIG. 2. The cage assembly 22 is designed in such a way that it extends over a valve seat 24 provided in the valve body 18. The cage assembly 22 has a throttle zone 22b and a piston guide zone 22a.

Figure 2:
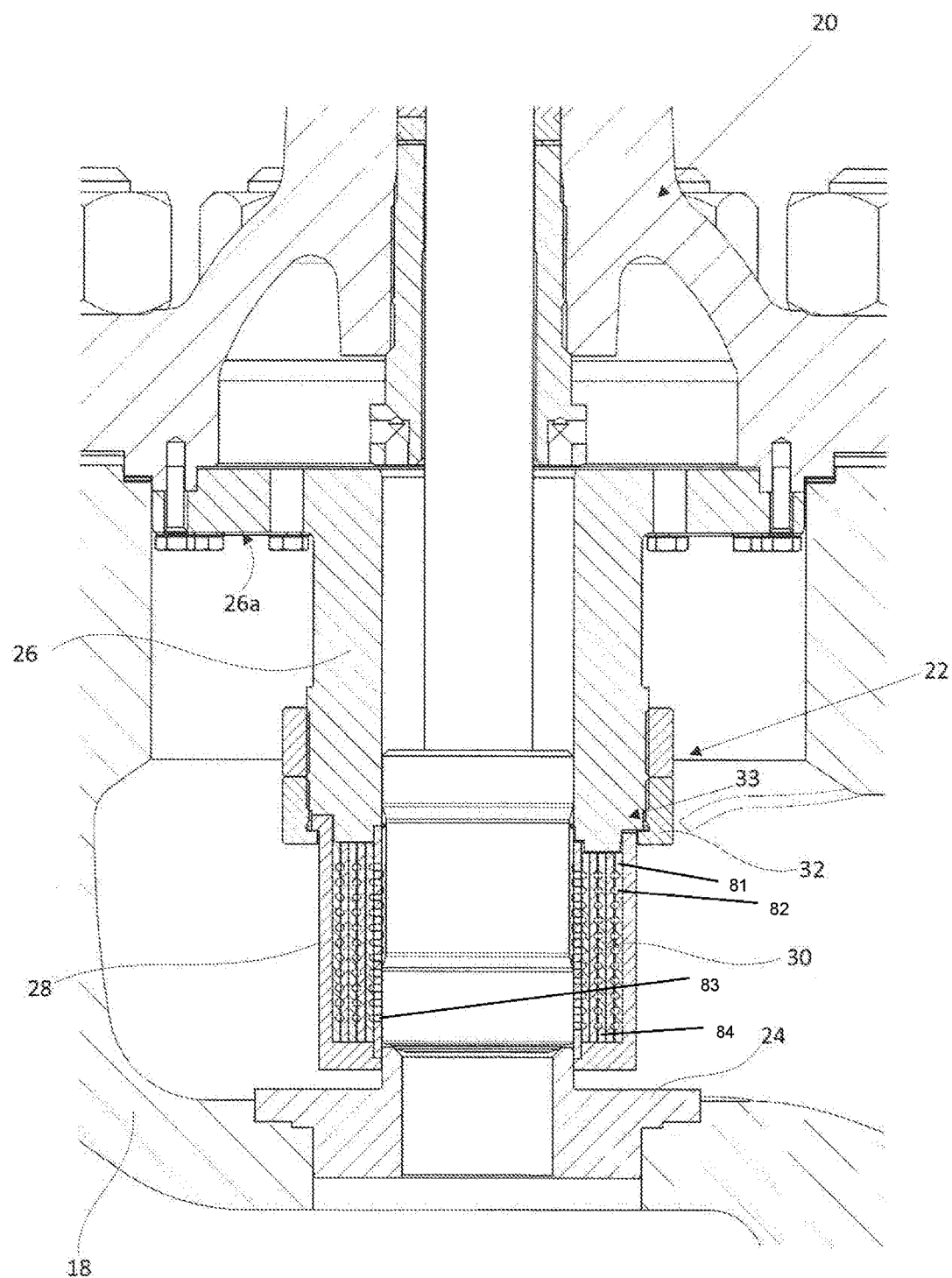

FIG. 2 is a view of an enlarged detail of the control valve 10 of FIG. 1. The enlarged detail shows the valve cover 20, the cage assembly 22, the basic valve body 18 in which the valve seat 24 has been inserted.

The cage assembly 22 comprises a piston guide element 26 and a retaining element 28. The retaining element 28 holds a plurality of throttle elements 30 which are used to influence the throttle characteristics of the cage valve in a modular manner. The retaining element 28 is cup-shaped and its end facing the piston guide element is provided with a shoulder via which the retaining element 28 can be screwed to the piston guide element 26 by means of a union nut 32. Furthermore, a rotation-locking device 33 is provided which is used to secure the retaining element against rotation relative to the piston guide element, by means of a thickened portion on the piston guide element and a recess in the retaining element. The throttle elements 30 are thus clamped between the piston guide element 26 and the retaining element 28 in the axial direction. The piston guide element 26 comprises a flange portion 26a through which the entire cage assembly 22 is screwed to the valve cover 20. The valve cover 20 can thus be used to insert the entire cage assembly 22 into the basic valve body 18. In this process, the cage assembly 22 is plugged onto the valve seat 24.

The throttle elements 30 include cylinders 81, 82, 83, 84 with spaces and apertures therein for the flow of fluid therein as illustrated in FIG. 2.

This provides an easy way to mount a prefabricated valve cage of a modular structure in a basic valve body.

FIG. 3 is a view of a detail of another embodiment of an inventive control valve 40 which comprises a valve cover 42 and a cage assembly 44 as well as a valve seat 48 inserted in a valve housing 46. The cage assembly comprises a piston guide element 50 and throttle disks 52 which are fixed on the piston guide element 50. The throttle disks 52 are fixed in position axially and radially on the piston guide element 50 by means of a retaining element 54. In the embodiment illustrated, the retaining element is a centrally mounted hollow-bored screw of a screw connection. Alternatively, the retaining element is part of a flange connection. Alternatively, the retaining element can also be a part of a retaining ring connection. The piston guide element 50 likewise has a flange portion 50a by means of which the cage assembly 44 is attached to the valve cover 42. The cage assembly 44 is fitted on the valve seat 48 in a manner similar to the one of FIG. 1.

The throttle disks 52 include spaces and apertures 85, 86 therein and therebetween for the flow of fluid therein as illustrated in FIG. 3.

FIG. 4 is a view of a detail of yet another embodiment of an inventive control valve 60, comprising a valve cover 62, a cage assembly 64 as well as a basic valve body 66. The cage assembly 64 comprises a piston guide element 68 having a cylindrical widened portion on its end facing away from the valve cover for receiving the throttle disks 70 therein. Furthermore, the cage assembly comprises a retaining element 72 having an external thread allowing this element 72 to be screwed into the piston guide element 68.

The throttle disks 70 include spaces and apertures 87, 88 therein and therebetween for the flow of fluid therein as illustrated in FIG. 4.

In this embodiment, the retaining element 72 is designed as a valve seat which is adapted to be inserted into a corresponding recess provided in the valve.

LIST OF REFERENCE SIGNS 10 control valve
12 drive
14 valve rod
16 piston
18 basic valve body
20 valve cover
22 cage assembly
22a piston guide zone
22b throttle zone
24 valve seat
26 piston guide element
26a flange region
28 retaining element
30 throttle element
32 union nut
33 rotation-locking device
40 control valve
42 valve cover
44 cage assembly
46 valve housing
50 piston guide element
50a flange region
52 throttle disk
54 retaining element
60 control valve
62 valve cover
64 cage assembly
66 basic valve body
68 piston guide element
68a flange region
70 throttle disk
72 retaining element
81 cylinder
82 cylinder
83 cylinder
84 cylinder
85 apertures
86 apertures
87 apertures
88 apertures

The invention claimed is:

1. Cage valve, comprising:
a valve cover, a piston, a piston guide, a valve body, and a valve cage,
said valve cage comprising:
a retaining element, said retaining element includes an end portion and said end portion includes a valve seat, and a plurality of throttle elements,
said retaining element receives and secures said throttle elements, said throttle elements include throttling discs for fluid communication therethrough depending on the position of said piston;
said retaining element resides distally with respect to said cover; said retaining element has an external thread, said piston guide includes an internal thread, and, said retaining element is threadedly interconnected with said piston guide, and,
said valve cage is connected to said valve cover and said valve cage and said valve cover are removable from said valve body as a unit.

2. Cage valve according to claim 1, further comprising:
said throttle elements are fixed in the axial direction by said retaining element and by said piston guide.

3. Cage valve according to claim 1, further comprising:
said piston guide has a flange screwed onto said valve cover.

* * * * *